United States Patent Office 2,849,402
Patented Aug. 26, 1958

2,849,402

GREASE COMPOSITION CONTAINING CHLOROSULFONATED POLYMER

Earl D. Rogak, Brooklyn, N. Y., assignor to Sinclair Refining Company, New York, N. Y., a corporation of Maine No Drawing. Application July 13, 1954
Serial No. 443,167

7 Claims. (Cl. 252—42.1)

This invention relates to grease compositions and in particular is concerned with grease compositions containing chlorosulfonated hydrocarbon polymers.

It is an established practice in lubricant manufacture to employ additives in the final compositions to impart certain desirable properties. Functionally the additives act as oxidation and corrosion inhibitors, detergents, dispersants, pour depressants, viscosity index improvers, anti-foam agents, rusting inhibitors, oiliness or film strength agents, etc. Certain additives impart undesirable properties to compositions containing them. For example, in most extreme pressure lubricants the active ingredient is in a corrosive form at operating temperatures and is often very susceptible to oxidation. Another disadvantage of conventional extreme pressure agents is a characteristic bad odor. Normally, there is no way of alleviating these faults as the action of this class of additives is believed to be due to chemical reaction with the bearing metal and the faults are attributed to the resulting reaction products.

In the present invention I have discovered that grease compositions can be prepared which have materially improved extreme pressure and anti-wear properties. I have also discovered that grease compositions can be prepared having improved extreme pressure and anti-wear characteristics without imparting undesirable properties to the compositions. These advantages are obtained in accordance with my invention by incorporating in a lubricating grease chlorosulfonated polymers of aliphatic unsaturated hydrocarbons having about two to five carbon atoms per molecule.

The chlorosulfonated polymers of aliphatic unsaturated hydrocarbons which are incorporated in greases to form compositions of the present invention are characterized by a range of chemical compositions. Suitable hydrocarbon base materials to form the polymers include ethylene, propylene, butylene, isobutylene, 1,3-butadiene, amylene and the like. In general the hydrocarbons are polymerized according to known procedures to obtain high molecular weight polymers, for example, molecular weights of from about 500 to 50,000 or more. The polymers can then be reacted at elevated temperatures with a suitable sulfur chlorine compound, i. e., sulfur monoxytetrachloride and sulfur trioxytetrachloride, according to any known process. The resulting chlorosulfonated polymer, like the hydrocarbon polymer itself, is a highly complex reaction product incapable of exact chemical construction. It is believed, however, that most of the chlorine is distributed along the hydrocarbon chain, and the sulfur is combined with chlorine and attached to the chain as sulfonyl chloride ($SO_2Cl$). Molecular weights of various chlorosulfonated hydrocarbon polymers usually range from about 1100 to 118,000; in general, I prefer to employ those chlorosulfonated polymers having molecular weights of about 3500 to 100,000. Chlorine is usually present to the extent of about one chlorine atom for each 4 to 10 carbon atoms and sulfonyl chloride groups normally are present to the extent of about one for each 10 to 125 carbon atoms. In general, suitable ranges of compositions include about 20 to 40 weight percent of chlorine and about 1.25 to 12 weight percent sulfur. Preferred polymer compositions contain about 20 to 30 weight percent chlorine and about 1.5 to 5 weight percent sulfur. Chlorosulfonated polymers having compositions outside the above ranges can be employed, but I have obtained particularly satisfactory results when using compositions containing polymers having chlorine and sulfur contents within the ranges indicated. Chlorosulfonated polymers of aliphatic unsaturated hydrocarbons which can be employed in the present invention are, in general, articles of commerce; a highly satisfactory commercially available polymer is known as Hypalon-S2 and is a chlorosulfonated polyethylene containing about 27.5% chlorine and about 1.5% sulfur.

Chlorosulfonated polymers of aliphatic unsaturated hydrocarbons are incorporated in greases in small but sufficient amounts to produce compositions having extreme pressure and anti-wear properties. In general, these desirable properties are evidenced by compositions of my invention containing the chlorosulfonated polymers in amounts of about 0.1 to 10 weight percent or more. It is preferred to employ about 0.5 to 5 weight percent of the polymer. In addition to being characterized by extreme pressure and anti-wear properties, my novel compositions are further advantageous in that they demonstrate a stringiness which is desirable for special lubrication problems, an improved soap yield and rather than being malodorous as is characteristic of conventional extreme pressure agents, the compositions are substantially without odor attributable to the additive.

The grease constituent of my new compositions can be any known grease covering the entire range of N. L. G. I. classifications. For instance, the fatty component of the grease can be any of the fatty acid saponifiable materials having from about 10 to 32 carbon atoms and can be saturated or unsaturated and substituted as with other polar groups. These acids include palmitic, stearic, oleic, linoleic, ricinoleic, palm oil fatty acids, cottonseed oil fatty acids, hydrogenated fish oil fatty acids, and their mixtures. Also, the glycerides of these acids can be used such as lard, lard oil, rape seed oil, palm seed oil, etc. Other acids which can be employed are those derived from petroleum such as naphthenic acids, petroleum sulfonic acids, and petroleum oil and wax oxidates. The preferred saponifiable materials are those in which the hydroxyl group is at least 12 carbon atoms removed from the carboxyl group, e. g., 12-hydroxy stearic acid and hydrogenated castor oil.

Among the saponifying or soap-forming bases which can be used in my invention are the alkali metal bases such as those of lithium, sodium and potassium, and the alkaline earth metal bases such as those of barium, calcium and strontium. Other saponifying metals normally used in forming the soap constituents of greases can be employed, e. g., aluminum, lead, cerium and the like. Mixtures of these soaps can also be utilized. The soap content of my grease compositions will usually vary within the range of about 5 to 25%; most advantageously the soap content will vary between about 5 and 15% by weight based on the total composition.

Greases employed in the present invention can be oil base greases having a mineral oil or synthetic oil base or can be synthetic diester base greases such as di-(2-ethyl hexyl adipate). The mineral oils which can be used are of wide viscosity range, for instance, from about 50 SUS at 100° F. to about 2000 SUS at 210° F. The oil can be highly refined and solvent-treated, if desired, by known means. Among the synthetic lubricants which can be employed are polymerized olefins, alkylated aromatics, silicone polymers, polyalkylene glycols and their partial or complete ethers and esters.

Grease compositions to be used in the present invention can be prepared from preformed soaps, or the soaps can be formed in situ in a grease forming base. In general, I prefer to thicken a base material, such as a mineral oil, with a soap formed in situ and then dehydrate and adjust the end properties of the grease to the desired range by incorporating additional base oil.

The novel grease base compositions containing chlorosulfonated polymers of aliphatic unsaturated hydrocarbons can be made by incorporating a suitable polymer, e. g., chlorosulfonated polyethylene, in a base grease, such as a grease made by thickening to grease consistency a solvent-refined Mid-Continent lubricating oil having a viscosity of about 430 SUS at 100° F. with lithium 12-hydroxy stearate formed in situ. The chlorosulfonated polymer can be dissolved in the grease at an elevated temperature, i. e., about 150 to 200° F., and then stirred to insure uniformity. Preferably, the grease compositions of the present invention are formed by incorporating the chlorosulfonated hydrocarbon polymer in the starting oil or finishing oil in a conventional grease making process. Generally, a temperature of above about 150° F. is sufficient to dissolve the polymer, and it is preferred to incorporate the polymer at temperatures below about 330° F. however added. Other materials normally incorporated in greases can be added to the compositions and are added preferably after the incorporation of the polymers. Other additives include stabilizing agents such as the higher polyalkylene glycols, oxidation inhibitors, corrosion inhibitors, and the like. Such additives are employed in the grease compositions usually in amounts ranging from 0.01% to 2% or more.

The invention will be illustrated in further detail by the following specific examples:

EXAMPLE I

A mineral oil grease composition employed in this example was prepared as follows: one part of hydrogenated castor oil was dissolved in 4 parts of a solvent refined Mid-Continent lubricating oil having a viscosity of 430 SUS/100° F. by heating to 180° F. One third part of Hypalon S-2, a chlorosulfonated polyethylene containing 27.5 weight percent chlorine and 1.5 weight percent sulfur, was added and readily dissolved at 200° F. A stoichiometric quantity of lithium hydroxide dissolved in 4 parts of boiling water was then added. The reaction and dehydration were completed at 320° F., and sufficient finishing oil was added to adjust to final consistency. About 0.111 part of phenyl alpha naphthylamine, an oxidation inhibitor, was then added. The composition was passed through a colloid mill to yield a smooth, opaque grease. The grease composition, together with a similar grease which did not contain the chlorosulfonated hydrocarbon polymer, was analyzed and tested according to standard procedures to determine the characteristics of the grease. The results are tabulated below:

Table I

| | Lithium grease of Example I | Lithium grease without added polymer |
|---|---|---|
| Solvent refined Mid-Continent lube, 430 SUS/100° F., percent | 89.96 | 88.86 |
| Soap, percent lithium 12-hydroxy stearate | 9.0 | 10.0 |
| Phenyl alpha naphthylamine, percent | 1.0 | 1.0 |
| Chlorosulfonated polyethylene, percent | +3.0 | 0 |
| Tests: | | |
| ASTM penetrations— | | |
| Unworked | 299 | 309 |
| Worked 60 | 316 | 307 |
| Worked 100,000 | 334 | 333 |
| Increase 60–100,000 | +18 | +26 |
| Dropping point, ° F. | 388 | 392 |
| Wheel bearing test, 60 M. P. H., 250° F. | Pass | Pass |
| Leakage, grams | 3.9 | 4.2 |
| Norma-Hoffman oxidation, p. s. i. drop in 500 hours | 6 | 8 |
| Engine laboratory bearing performance: | | |
| High load high temperature test, hours to failure (500 pounds, 250° F., 750 R. P. M.) | 1,064 | [1] 456 |
| High speed, high temperature test, hours to failure (10,000 R. P. M., 250° F) | Over 2,500 | [1] 955 |
| Shell 4-ball EP, mean Hertz load, kg. | 36.0 | ⁰5.3 |
| Shell 4-ball wear test, wear scar diameter in mm. (180° C., 640 R. P. M., 5 kg. load, 30 min.) | 0.22 | 0.45 |

[1] Average.

From the data in Table I it can be seen that compositions according to the present invention demonstrate marked superiority over compositions of similar greases which do not contain the chlorosulfonated hydrocarbon polymer. Superiority of my compositions is especially apparent in the bearing performance data; bearing performance of a lubricant is a function of its extreme pressure and wear properties.

EXAMPLE II

A synthetic oil base grease composition was prepared as follows: one part of 12-hydroxy stearic acid was added to five parts of di-(2-ethyl hexyl adipate). One sixth part of Hypalon S-2 was then added and the temperature raised to 200° F. A stoichiometric quantity of lithium hydroxide in 4 parts of hot water was then added. The reaction was completed, and the system was dehydrated at 320° F. About 0.208 part of phenyl alpha naphthylamine was added. Finishing oil sufficient to adjust to the final consistency was then incorporated, and the grease composition was passed through a colloid mill to yield a smooth, opaque, slightly stringy grease. A similar base grease with the Hypalon replaced by 4% Union Base and 2.5% lead oleate was compared with the grease composition of the present invention. The results are as follows:

Table II

| | Synthetic oil base grease | |
|---|---|---|
| | With Hypalon | Without Hypalon |
| Soap content, lithium 12-hydroxy stearic acid, percent | 12.4 | 13.38 |
| Tests: | | |
| ASTM penetrations— | | |
| Unworked | 273 | 284 |
| Worked 60 | 307 | 307 |
| Worked 100,000 | 343 | 341 |
| Increase 60–100,000 | +36 | +34 |
| Norma-Hoffman oxidation, p. s. i. drop in 500 hours | 2 | 19 |
| Shell 4-ball wear test, wear scar diameter in mm. (7 kg., 180° C., 640 R. P. M., 30 min.) | 6.9 | 8.0 |

The data in Table II show the superiority of grease compositions of the present invention over a similar grease which did not contain the chlorosulfonated hydrocarbon polymer. In addition to the tests indicated in Table II, the greases were subjected to all the laboratory tests for MIL-G-7118 specifications; grease containing the chlorosulfonated polyethylene passed while the grease which did not contain the polymer did not pass.

I claim:

1. A grease composition comprising a lubricating oil thickened to grease consistency with a metal base fatty acid soap and having incorporated therein a chlorosulfonated polymer, having a molecular weight of about 1100 to 118,000 of aliphatic unsaturated hydrocarbons having two to five carbon atoms per molecule in an amount sufficient to impart extreme pressure properties to the composition.

2. A grease composition comprising a lubricating oil thickened to grease consistency with a metal base fatty acid soap and having incorporated therein a chlorosulfonated polymer, having a molecular weight of about 1100 to 118,000, of an aliphatic unsaturated hydrocarbon having two to five carbon atoms per molecule in an amount of about 0.1 to 10 weight percent based on the total composition.

3. A grease composition comprising a mineral lubricating oil thickened to a grease consistency with a metal base fatty acid soap and having incorporated therein about 0.5 to 5 weight percent of a chlorosulfonated polyethylene having a molecular weight of about 3500 to 100,000.

4. The composition of claim 3 wherein the chlorosulfonated polyethylene has a chlorine content of about 20 to 30% and a sulfur content of about 1.5 to 5% each based on the weight of the chlorosulfonated polyethylene.

5. The composition of claim 4 wherein the chlorosulfonated polyethylene has a chlorine content of about 27.5%, and a sulfur content of about 1.5% and wherein the fatty acid soap is lithium 12-hydroxy stearate.

6. The composition of claim 1 in which the soap is lithium 12-hydroxy stearate.

7. The composition of claim 3 in which the soap is lithium 12-hydroxy stearate.

References Cited in the file of this patent

UNITED STATES PATENTS

| | | |
|---|---|---|
| 2,214,379 | Moser | Sept. 10, 1940 |
| 2,259,695 | Hull | Oct. 21, 1941 |
| 2,483,499 | Lieber et al. | Oct. 4, 1949 |
| 2,640,048 | Beekley | May 26, 1953 |

OTHER REFERENCES

Du Pont "Hypalon" S-2 Chlorosulfonated Polythene No. X-32, pub. by E. I. du Pont de Nemours & Co., Wilmington, Del. Copy received in Patent Office August 8, 1952, pages 1, 7 and 22-29.

Du Pont "Hypalon" Chlorosulfonated Polyethylene No. X-32a, pages 3, 8, 11, 20-23 and 26, pub. by E. I. du Pont de Nemours & Co., Wilmington, Del. Copy received in Patent Office September 21, 1953.